US012659699B2

(12) United States Patent
Linenberger et al.

(10) Patent No.: US 12,659,699 B2
(45) Date of Patent: Jun. 16, 2026

(54) SELECTIVE COMMUNICATION TRANSMISSION

(71) Applicant: Capital One Services, LLC, McLean, VA (US)

(72) Inventors: Jason Andrew Linenberger, Irving, TX (US); Haresh Devrajbhai Diyora, Murphy, TX (US); Thiru Gunturu, Little Elm, TX (US); Adarsh Tandon, Plano, TX (US); Sabrina Peng, Plano, TX (US); Leland Driver, Frisco, TX (US); Angelique Bautista, Van Alstyne, TX (US); Lindsey Santola, Denver, CO (US); Daniel Pereira, Manhattan, KS (US)

(73) Assignee: Capital One Services, LLC, McLean, VA (US)

( * ) Notice: Subject to any disclaimer, the term of this patent is extended or adjusted under 35 U.S.C. 154(b) by 337 days.

(21) Appl. No.: 18/362,607

(22) Filed: Jul. 31, 2023

(65) Prior Publication Data

US 2025/0048061 A1     Feb. 6, 2025

(51) Int. Cl.
| | |
|---|---|
| *H04W 4/06* | (2009.01) |
| *H04W 4/021* | (2018.01) |
| *H04W 4/12* | (2009.01) |

(52) U.S. Cl.
CPC ............. *H04W 4/06* (2013.01); *H04W 4/021* (2013.01); *H04W 4/12* (2013.01)

(58) Field of Classification Search
CPC ......... H04W 4/06; H04W 4/021; H04W 4/12; H04W 4/90

USPC .......................................................... 370/312
See application file for complete search history.

(56) References Cited

U.S. PATENT DOCUMENTS

| | | | | |
|---|---|---|---|---|
| 10,996,675 B1* | 5/2021 | Yaqub | .................... | G05D 1/102 |
| 11,283,923 B1* | 3/2022 | Messerges | .......... | H04M 3/5235 |
| 2013/0042011 A1* | 2/2013 | Sugizaki | .............. | H04W 76/18 |
| | | | | 709/227 |
| 2013/0297195 A1* | 11/2013 | Das | ........................ | G08G 1/163 |
| | | | | 701/117 |
| 2015/0140924 A1* | 5/2015 | Marathe | .................. | H04W 4/90 |
| | | | | 455/3.01 |
| 2017/0105103 A1* | 4/2017 | Weidenfeller | ......... | H04H 60/49 |
| 2018/0150601 A1* | 5/2018 | Astigarraga | .......... | G06Q 50/14 |
| 2019/0261145 A1* | 8/2019 | South | ...................... | H04W 4/30 |

(Continued)

OTHER PUBLICATIONS

Homepoint, "In the Wake of Natural Disasters, We're Here for You," 5 pages, retrieved on Jul. 31, 2023, available at https://www.homepointfinancial.com/disaster-resources/.

*Primary Examiner* — Jean A Gelin
(74) *Attorney, Agent, or Firm* — Harrity & Harrity, LLP

(57) ABSTRACT

In some implementations, a device may retrieve, from a user database, information identifying a plurality of users that are to be subjected to an adverse action. The device may retrieve, from an event stream, event data relating to an incident that has affected an affected area, where the event data indicates at least a location of the affected area. The device may identify, based on the information identifying the plurality of users, one or more users of the plurality of users that reside in the location of the affected area. The device may cause transmission of communications relating to the adverse action for each of the plurality of users, except for the one or more users that reside in the location of the affected area.

20 Claims, 9 Drawing Sheets

100

(56)              References Cited

U.S. PATENT DOCUMENTS

| | | | |
|---|---|---|---|
| 2021/0191802 A1* | 6/2021 | Hunter | G06F 11/0793 |
| 2024/0273383 A1* | 8/2024 | Pandey | G01W 1/06 |
| 2024/0303748 A1* | 9/2024 | Lovings | G06Q 40/08 |
| 2024/0334162 A1* | 10/2024 | Tran | H04W 4/90 |

* cited by examiner

100

105
Obtain incident information indicating a location of an affected area 90005
90006
95191
95608
...

Incident Information

Information Service Device

Management System

Publisher System

Consumer System

110
Obtain reference information indicating a current state associated with the location Reference Source

200

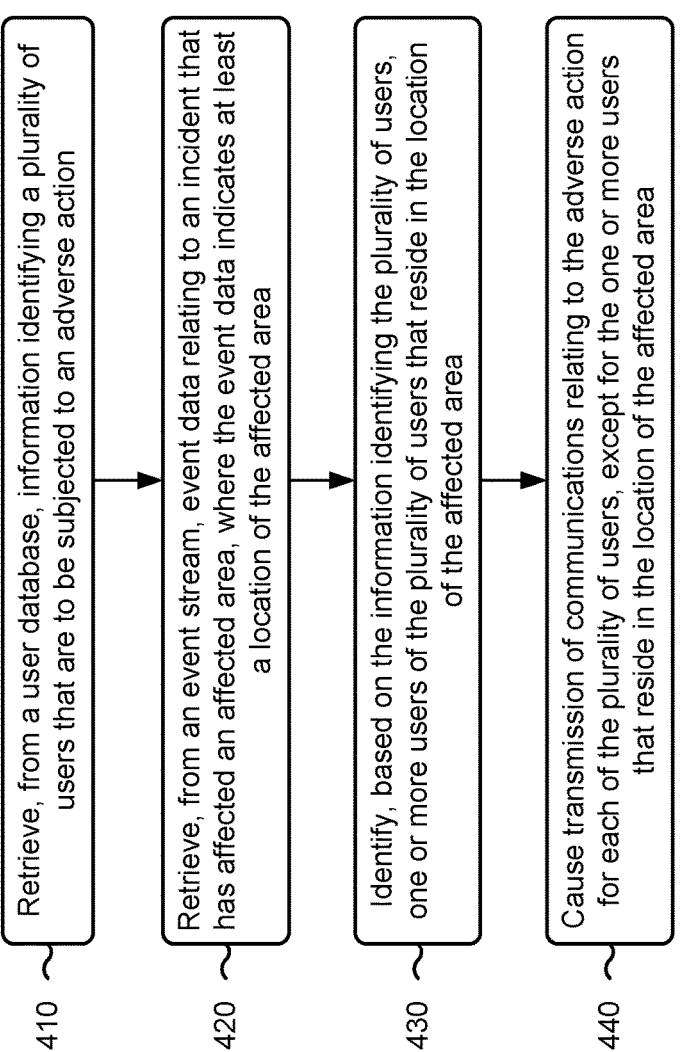

410  Retrieve, from a user database, information identifying a plurality of users that are to be subjected to an adverse action 420  Retrieve, from an event stream, event data relating to an incident that has affected an affected area, where the event data indicates at least a location of the affected area 430  Identify, based on the information identifying the plurality of users, one or more users of the plurality of users that reside in the location of the affected area 440  Cause transmission of communications relating to the adverse action for each of the plurality of users, except for the one or more users that reside in the location of the affected area

SELECTIVE COMMUNICATION TRANSMISSION

BACKGROUND

A communication device may transmit communications by email, text message, automated phone calls, or the like. In some examples, the communication device may transmit hundreds, thousands, or even millions of communications over a relatively short period of time. Sometimes, a recipient of a communication may not open, read, answer, or respond to the communication.

SUMMARY

Some implementations described herein relate to a system for selective communication transmission. The system may include one or more memories and one or more processors communicatively coupled to the one or more memories. The one or more processors may be configured to obtain, from an information service device, incident information indicating a location of an affected area that has been affected by an incident. The one or more processors may be configured to obtain, from a reference source, reference information indicating a current state associated with the location of the affected area. The one or more processors may be configured to determine the incident that has affected the affected area by processing the reference information indicating the current state associated with the location of the affected area. The one or more processors may be configured to retrieve, from a user database, information identifying a plurality of users that are to be subjected to an adverse action. The one or more processors may be configured to cause, based on the incident satisfying one or more conditions, transmission of communications relating to the adverse action for each of the plurality of users, except for one or more users, of the plurality of users, that reside in the location of the affected area.

Some implementations described herein relate to a method of selective communication transmission. The method may include retrieving, by a device and from a user database, information identifying a plurality of users that are to be subjected to an adverse action. The method may include retrieving, by the device and from an event stream, event data relating to an incident that has affected an affected area, where the event data indicates at least a location of the affected area. The method may include identifying, by the device and based on the information identifying the plurality of users, one or more users of the plurality of users that reside in the location of the affected area. The method may include causing, by the device, transmission of communications relating to the adverse action for each of the plurality of users, except for the one or more users that reside in the location of the affected area.

Some implementations described herein relate to a non-transitory computer-readable medium that stores a set of instructions. The set of instructions, when executed by one or more processors of a device, may cause the device to retrieve, from a user database, information identifying a plurality of users that are to be subjected to an adverse action. The set of instructions, when executed by one or more processors of the device, may cause the device to identify a location of an affected area that has been affected by an incident. The set of instructions, when executed by one or more processors of the device, may cause the device to cause transmission of communications relating to the adverse action for each of the plurality of users, except for one or more users of the plurality of users that reside in the location of the affected area.

BRIEF DESCRIPTION OF THE DRAWINGS

FIG. 4 is a flowchart of an example process associated with selective communication transmission, in accordance with some embodiments of the present disclosure.

DETAILED DESCRIPTION

Figure 1A:
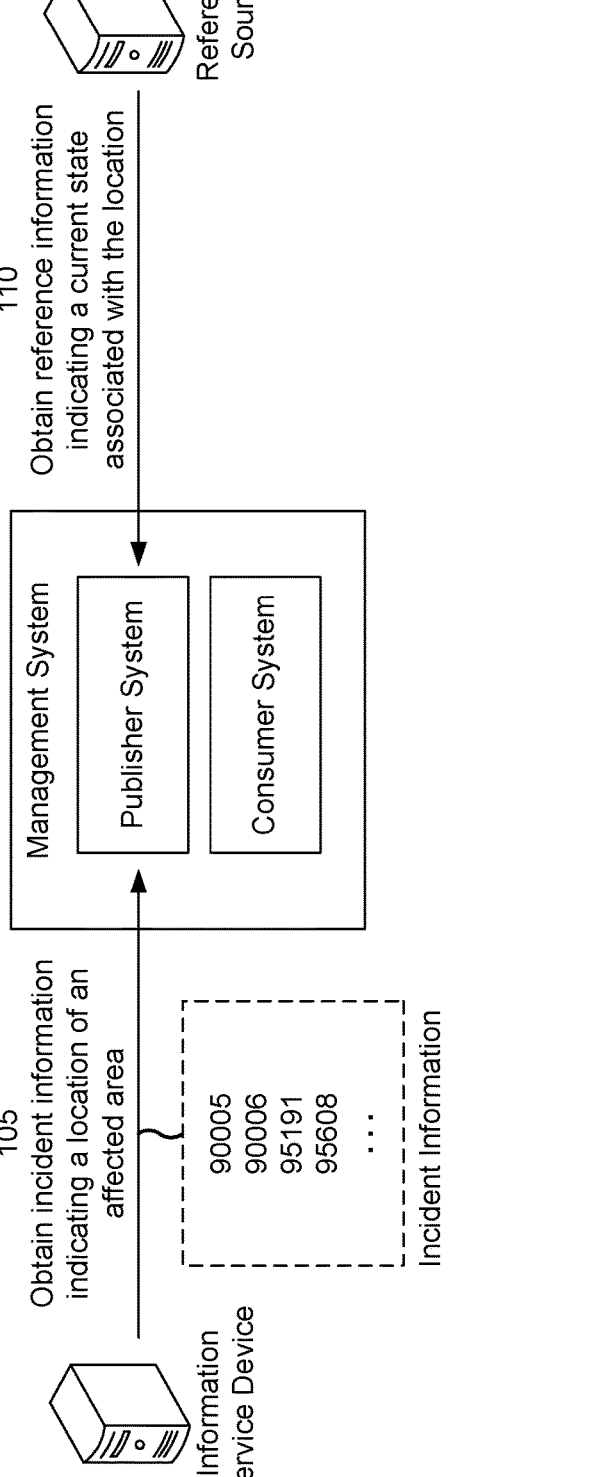
FIGS. 1A-1F are diagrams of an example associated with selective communication transmission, in accordance with some embodiments of the present disclosure.

The following detailed description of example implementations refers to the accompanying drawings. The same reference numbers in different drawings may identify the same or similar elements.

Communications may be transmitted by email, text message, automated phone calls, or the like. In general, the transmission of a single communication may use minimal computing resources (e.g., memory resources, processor resources, or the like) of the transmitter and minimal resources of a communications network on which the communication is transmitted. However, commonly, an entity may be engaged in operations that call for the transmission of hundreds, thousands, or even millions of communications, which in the aggregate place a significant burden on computing resources and network resources. A timing for transmission of a communication may play a role in whether a recipient engages with the communication (e.g., opens the communication, reads the communication, responds to the communication, or the like). Thus, by transmitting communications without regard to timing, significant computing resources and network resources may be expended in an inefficient manner.

Some implementations described herein enable selective transmission of communications based on whether a recipient for a communication resides in a location of an area affected by an incident, such as a natural disaster. Accordingly, communications may be transmitted to a plurality of recipients, except for any recipients that reside in the location of the affected area. As an example, an entity may use communications to inform individuals about an adverse action (e.g., a vehicle repossession, a mortgage foreclosure, a loan collection, or the like) that is to be taken against the individuals. However, an individual residing in the location of the affected area, that otherwise may engage with such a communication, is unlikely to engage with the communication while the incident is ongoing.

Thus, by excepting that individual from the transmission of the communications (e.g., at least while the incident is ongoing), computing resources and network resources used for transmitting communications are utilized more efficiently.

FIGS. 1A-1F are diagrams of an example 100 associated with selective communication transmission. As shown in FIGS. 1A-1F, example 100 includes a management system, an information service device, a reference source, an incident database, an event stream device, an action control device, a user database, and one or more user devices. These devices are described in more detail in connection with FIGS. 2 and 3. The management system may be associated with an entity (e.g., a financial institution) that is to provide communications (e.g., emails, text messages, automated phone calls, or the like) to individuals for whom the entity is planning an adverse action (e.g., a vehicle repossession, a mortgage foreclosure, or the like). As shown, the management system may include a publisher system and a consumer system. The publisher system and the consumer system may share computing resources, may be virtual systems in the same cloud computing environment, and/or may include computing devices on the same local area network. Operations described herein as performed by the publisher system may be performed by the consumer system and/or another component of the management system, and operations described herein as performed by the consumer system may be performed by the publisher system and/or another component of the management system.

As shown in FIG. 1A, and by reference number 105, the management system (e.g., the publisher system of the management system) may obtain, from the information service device, incident information indicating a location of an affected area. The information service device may be associated with a governmental entity (e.g., the United States Federal Emergency Management Agency (FEMA)) or another entity that provides disaster declarations, a news information service, a weather information service, and/or a social media service. An affected area may be a geographic area that has been affected by an incident, such as a natural disaster. The area may be affected by the incident if property in the area has been damaged due to the incident and/or if people in the area have been injured due to the incident. The incident may be a disaster incident that has been declared for the affected area by an entity (e.g., FEMA).

To obtain the incident information, the management system may transmit, to the information service device, a request (e.g., an application programming interface (API) request) for the incident information, and the management system may receive, from the information service device, the incident information in response to the request (e.g., an API response). In some implementations, the incident information may relate to disaster declarations and may include a list of locations (e.g., a list of zip codes) associated with affected areas (e.g., the list may indicate only the locations, and not provide information relating to the incident(s) that affected the affected areas). In some implementations, the incident information may relate to weather data and may include a list of locations (e.g., a list of zip code) associated with one or more severe weather events.

Additionally, or alternatively, to obtain the incident information, the management system may extract information from one or more web pages, one or more social media posts, or the like, that are maintained (e.g., served, stored, or the like) by the information service device. For example, the information service device may maintain content relating to news or other current events. In a case where the extracted information is structured data, the management system may parse the extracted information to obtain the incident information. In a case where the extracted information is unstructured data, the management system may process the extracted information using an artificial intelligence (AI) model (e.g., a machine learning model), such as a natural language processing (NLP) model, to obtain the incident information. For example, the extracted information may include a description of one or more incidents relating to one or more affected areas, and the management system may perform NLP of the description to identify location(s) of the affected area(s), type(s) of the incident(s), or the like.

As shown by reference number 110, the management system (e.g., the publisher system of the management system) may obtain, from a reference source, reference information indicating a current state associated with the location of the affected area. The reference source may be different from the information service device, and therefore the reference information can be used to validate the incident information and/or provide additional details relating to the incident information. For example, the management system may use the incident information to identify at a high-level the locations of one or more affected areas (e.g., the incident information may indicate only locations, as described above), and the management system may use the reference information to ascertain details relating to an incident that affected a particular affected area (e.g., a type of the incident, a severity of the incident, or the like).

In a similar manner as described above, the reference information may include data from a data service (e.g., accessible via an API), one or more web pages, one or more social media posts, or the like. For example, the reference information may indicate weather data or information relating to news or other current events. The management system may obtain the reference information by performing a query (e.g., an API request, a search, or the like) particular to the location of the affected area. For example, based on knowing the location of the affected area from the incident information, the management system may obtain the reference information that is particular to the location. As an example, the incident information may indicate that a particular location (e.g., a particular zip code) is an area affected by an incident (e.g., but not indicate additional details on the incident), and the reference information may indicate weather data for that location, news articles that mention that location, social media posts that mention that location, or the like.

Figure 1B:
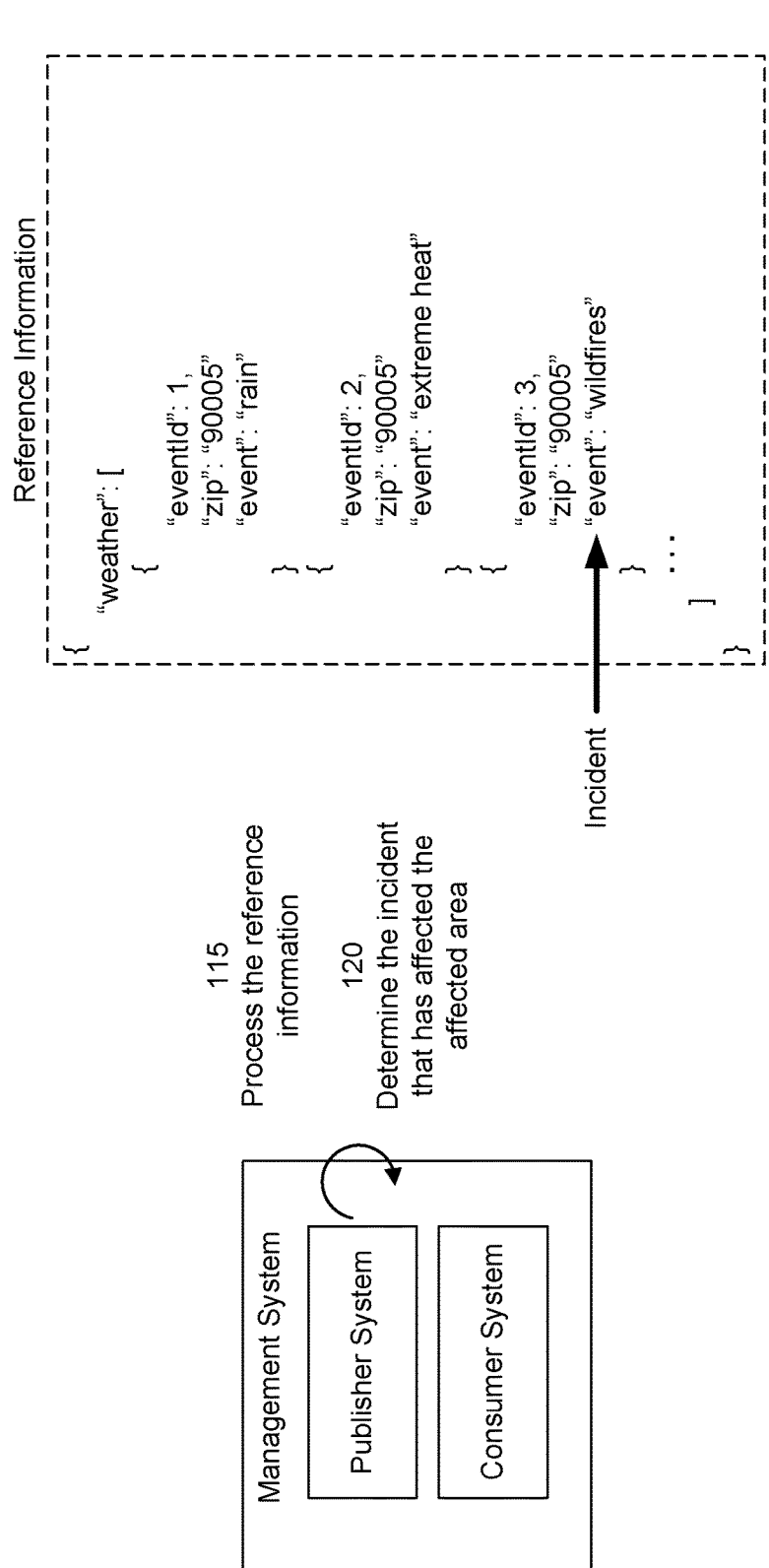

As shown in FIG. 1B, and by reference number 115, the management system (e.g., the publisher system of the management system) may process the reference information indicating the current state associated with the location of the affected area. As shown by reference number 120, the management system may determine the incident that affected the affected area based on processing the reference information. For example, the management system may determine a type of the incident, a description of the incident, a severity of the incident, a date that the incident occurred, or the like.

In a case where the reference information is structured data, the management system may parse the reference information to obtain parsed data relating to the incident, and the management system may determine the incident based on the parsed data. In a case where the extracted information is unstructured data, the management system may process the extracted information using an AI model (e.g., a machine learning model), such as an NLP model, and the management system may determine the incident based on an output of the AI model. In some implementations, the parsed data obtained from structured data may not provide a clear indication of the incident, and the management system may process the parsed data using the AI model, and determine the incident based on an output of the AI model. As an example, as shown, the reference information may include structured weather data particular to the location, and the structured weather data may indicate multiple events for the affected area. Continuing with the example, the management system may use an AI model to determine (e.g., based on severity) which of the multiple events is the incident that affected the affected area. Additionally, or alternatively, to processing the extracted information or the parsed data using the AI model, the management system may process the extracted information and/or the parsed data using a keyword matching technique to determine the incident.

In some implementations, the management system may determine a metric for the incident indicating a severity of the incident. For example, the management system may determine the metric using a machine learning model (e.g., a classification model) that is trained to output a metric for an incident based on an input indicating a type of the incident and/or a description of the incident. In some implementations, the machine learning model may be trained based on historical disaster information (e.g., from a FEMA database), which may indicate durations of disasters, resources deployed to disasters, financial costs associated with disasters, hospitalizations due to disasters, and/or casualties due to disasters, among other examples. The metric may indicate a severity score (e.g., from 0-100), a severity classification, or a length of time (e.g., a quantity of days) that the affected area is predicted to be affected by the incident.

Figure 1C:
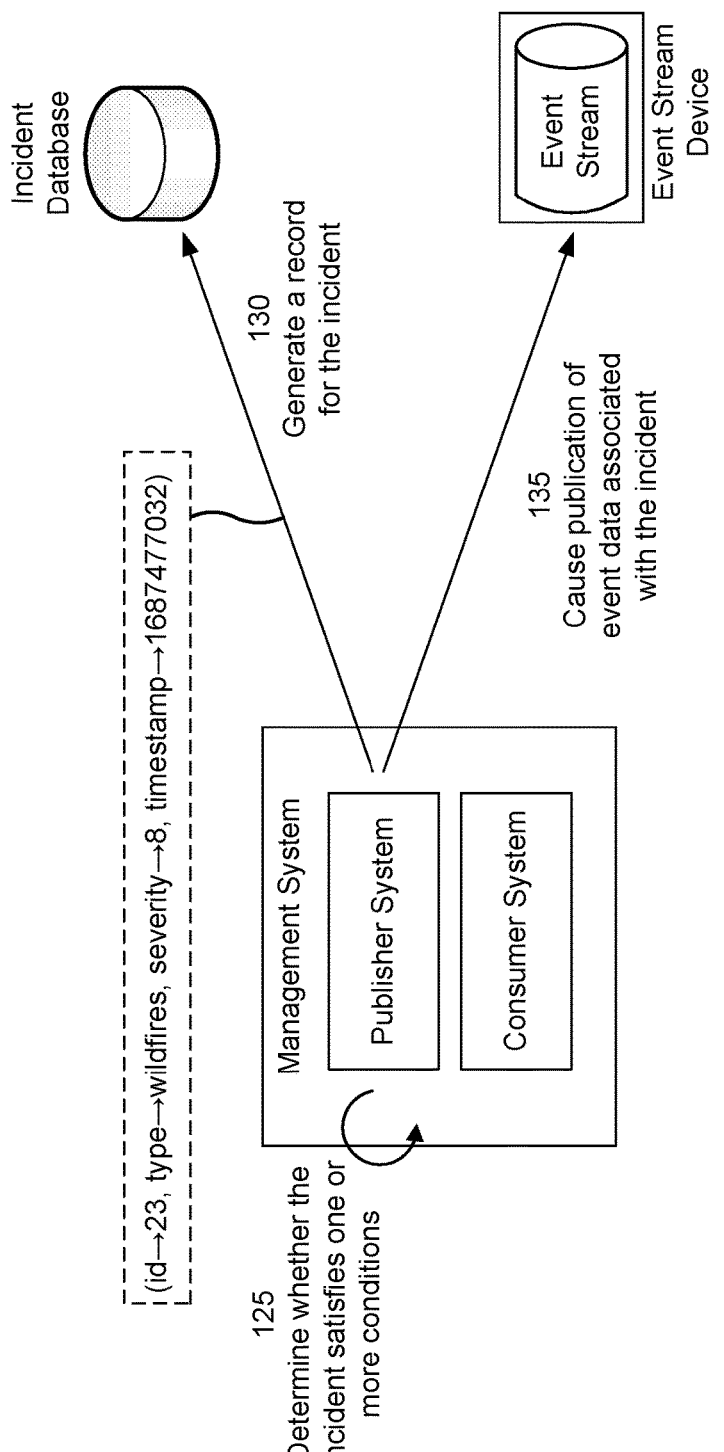

As shown in FIG. 1C, and by reference number 125, the management system (e.g., the publisher system of the management system) may determine whether the incident satisfies one or more conditions. For example, the incident satisfying the condition(s) may indicate that the incident can be added into the incident database, thereby indicating that the incident is severe enough to suppress the transmission of communications in connection with the incident, as described herein. The condition(s) may include a first condition that the age of the incident satisfies an age threshold and a second condition that a severity level of the incident satisfies a severity threshold (e.g., the incident may satisfy the condition(s) if the incident is recent enough and severe enough). In some implementations, the severity level of the incident may be based on a metric determined for the incident, as described herein. Additionally, or alternatively, the severity level of the incident may be based on a type of the incident (e.g., the management system may store a mapping of incident types to severity levels). In some implementations, the condition(s) may include a condition that a type of the incident is one of a plurality of enumerated incident types.

As shown by reference number 130, the management system (e.g., the publisher system of the management system) may generate a record for the incident in the incident database. For example, the management system may generate the record for the incident in the incident database based on the incident satisfying the condition(s) described in connection with reference number 125. The record may indicate at least the location of the affected area (e.g., identified from the incident information) and the type of the incident (e.g., determined from the reference information). The record also may indicate a severity associated with the incident (e.g., the metric determined for the incident) and/or a time and/or date when the incident began (e.g., when the affected area was first declared a disaster), among other examples.

In some implementations, after obtaining the incident information and identifying the location of the affected area from the incident information, the management system may generate the record for the incident in the incident database (e.g., which may initially indicate only the location of the affected area). In addition, the management system may cause transmission of a message (e.g., an email) to a user device associated with an administrator. The message may include a link to a user interface, and the management system may provide data from the record via the user interface for manual review by the administrator. The administrator may investigate the incident to determine whether the record is to be approved (e.g., remain in the incident database) or rejected (e.g., deleted from the incident database). Moreover, the administrator may investigate the incident to determine additional details relating to the incident (e.g., a type of the incident). For example, the investigation may include a manual performance of one or more of the operations described above (e.g., identifying the incident associated with the location, determining a metric for the incident, and/or determining whether the incident satisfies one or more conditions). The management system may receive an input, via the user interface, indicating whether the record is approved or rejected and/or indicating one or more updates for the record (e.g., based on the additional details).

As shown by reference number 135, the management system (e.g., the publisher system of the management system) may cause publication of event data associated with the incident to an event stream. For example, the management system may cause publication of the event data to the event stream based on the record being generated in the incident database. Additionally, or alternatively, the management system may cause publication of the event data to the event stream based on receiving the input, via the user interface, indicating that the record is approved and/or indicating updates for the record.

To cause publication of the event data to the event stream, the management system may transmit a publication request, including the event data, to the event stream device that provides an event stream service. The event stream service is a broker that receives event data, and distributes the event data to interested parties. The event stream may be organized into topics (e.g., including an incidents topic), and event data for a topic may be made available (e.g., by a pull retrieval or a push retrieval) to subscribers or consumers of the topic. The event data may indicate at least the location of the affected area. The event data may also indicate a silence period that is to be used for the incident and/or a type of the incident, among other examples.

Figure 1D:
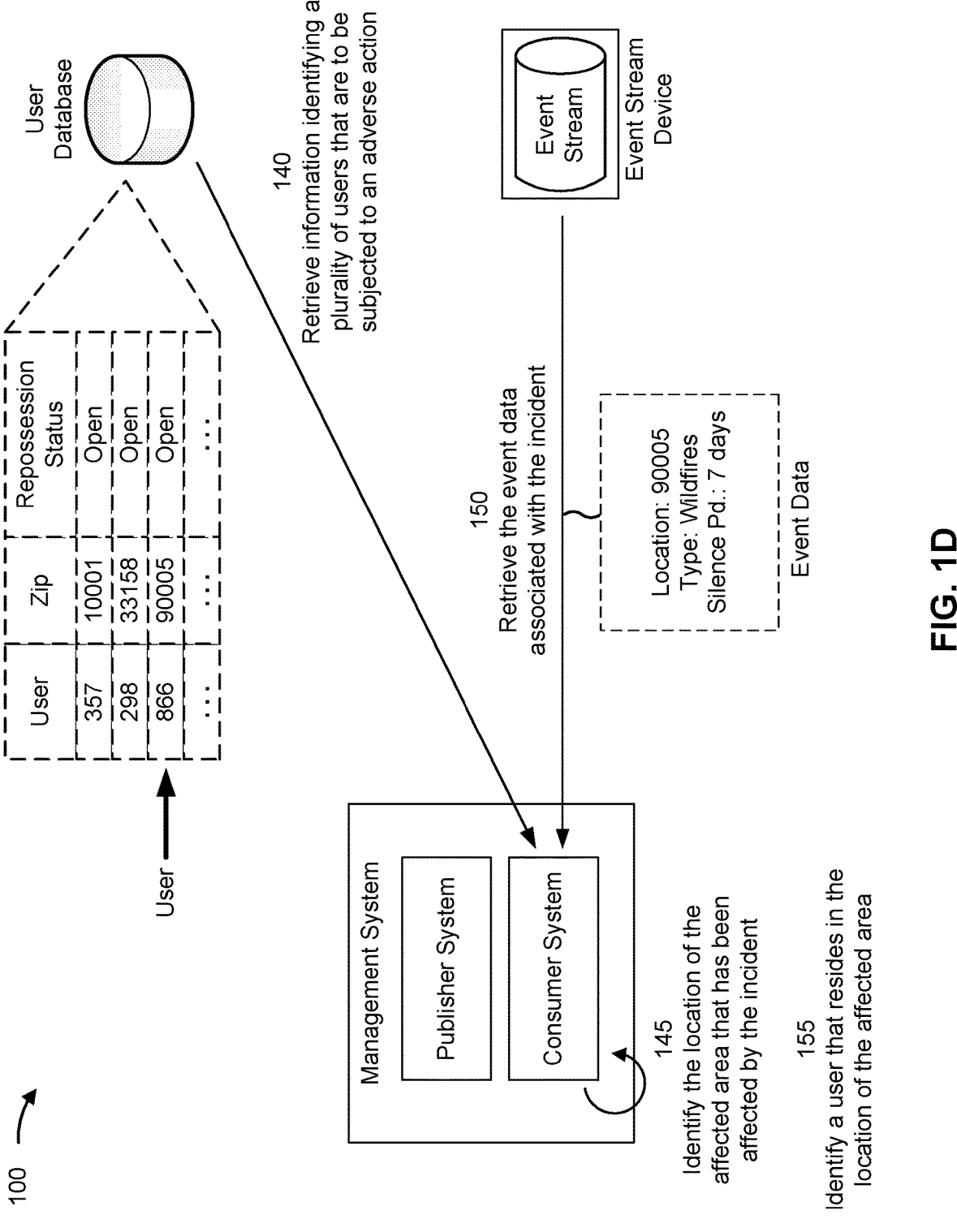

As shown in FIG. 1D, and by reference number 140, the management system (e.g., the consumer system of the management system) may retrieve, from the user database, information identifying a plurality of users that are to be subjected to an adverse action. An adverse action may be any action taken against an individual that will cause harm to a financial position or a property interest of the individual, or otherwise cause harm to a creditworthiness (e.g., a credit score) of the individual. The adverse action may be a repossession action or a foreclosure action. For example, the adverse action may relate to a vehicle repossession, a mortgage foreclosure, a loan collection, or a financial account closure, among other examples. The adverse action may be planned to be taken against the plurality of users at a future time. Accordingly, communications can be sent to the individuals informing them of the upcoming adverse action and/or indicating steps to prevent the adverse action.

As shown by reference number 145, the management system (e.g., the consumer system of the management system) may identify the location of the affected area that has been affected by the incident. For example, to identify the location of the affected area, as shown by reference number 150, the management system (e.g., the consumer system of the management system) may retrieve, from the event stream, the event data associated with the incident. To retrieve the event data, the management system may transmit, to the event stream device, a request (e.g., an API request) for events relating to incidents that have been published to the event stream, and receive, from the event stream device and in response to the request, the event data relating to the incident (e.g., a pull retrieval of the event data). In some implementations, to retrieve the event data, the management system may receive, from the event stream device (e.g., at regular intervals or in response to publication of new event data), the event data relating to the incident without having previously transmitted a request for events (e.g., a push retrieval of the event data). The event data may indicate the location of the affected area to the consumer system. For example, the event stream provides a way for the publisher system to communicate locations of affected areas to numerous different consumer systems (e.g., and each consumer system may be responsible for outbound communications relating to a respective type of adverse action).

As another example, to identify the location of the affected area, the management system (e.g., the consumer system of the management system) may process reference information, in a similar manner as described above. In a case where the reference information is structured data, the management system may parse the reference information to obtain parsed data relating to the incident, and the management system may determine the location of the affected area based on the parsed data, in a similar manner as described above. In a case where the extracted information is unstructured data, the management system may process the extracted information using an AI model (e.g., a machine learning model), such as an NLP model, and the management system may determine the location of the affected area based on an output of the AI model, in a similar manner as described above. In some implementations, the management system may process the parsed data using an AI model and/or a keyword matching technique to determine the location of the affected area, in a similar manner as described above.

As shown by reference number 155, the management system (e.g., the consumer system of the management system) may identify a user (e.g., one or more users), of the plurality of users, that resides in the location of the affected area. For example, the management system may identify the user based on the information identifying the plurality of users (e.g., which may indicate addresses, zip codes, or the like associated with the plurality of users). For example, the management system may filter the information identifying the plurality of users by the location of the affected area to identify the user(s) that reside in the location of the affected area.

Figure 1E:
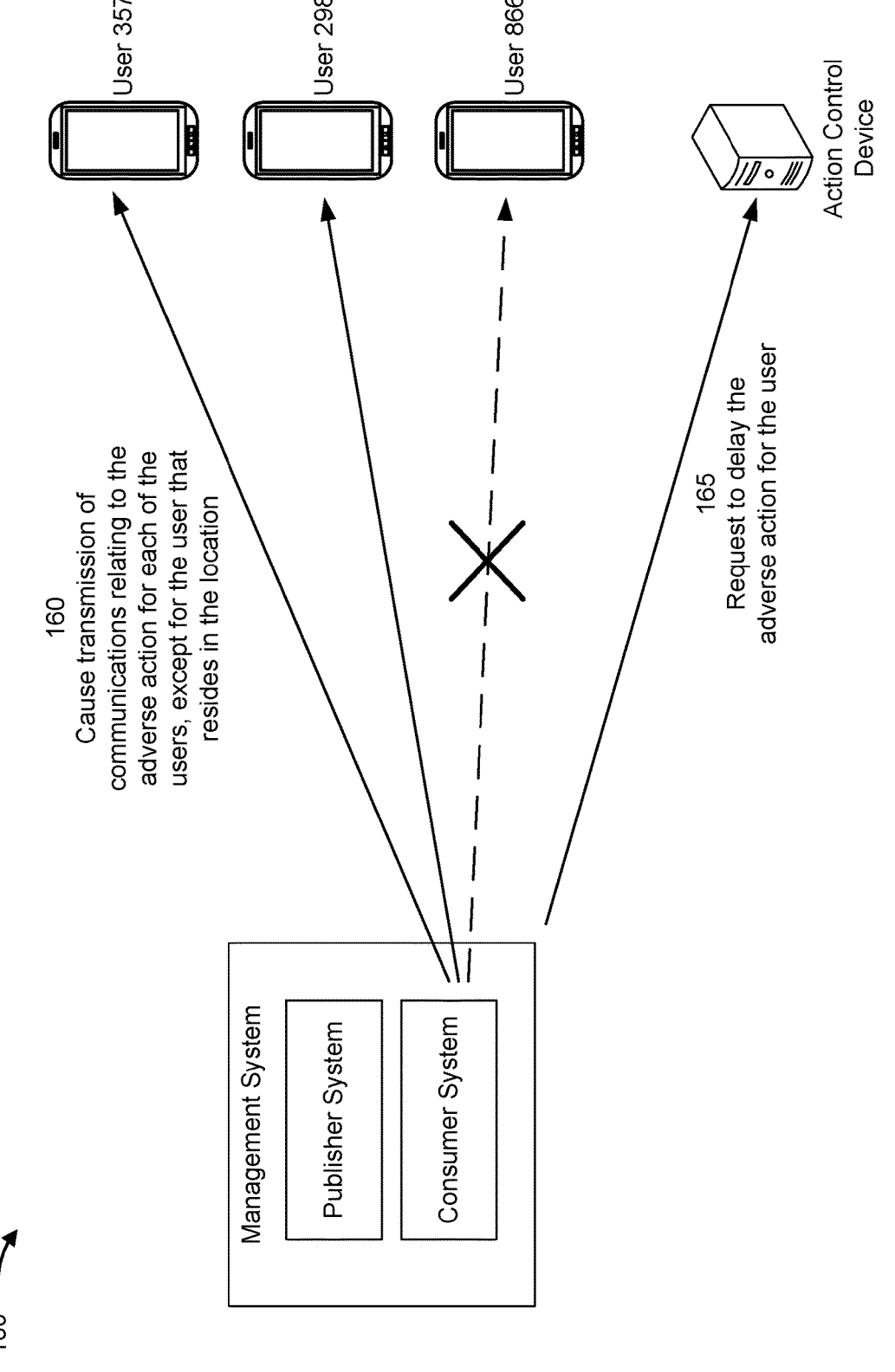

As shown in FIG. 1E, and by reference number 160, the management system (e.g., the consumer system of the management system) may cause transmission of communications relating to the adverse action. For example, the communications may provide a reminder of an upcoming adverse action, may request a user to take a particular action to avoid the adverse action, may request a user to perform the adverse action, or the like. The communications may include one or more email messages, one or more text messages, and/or one or more automated phone calls, among other examples. Thus, transmission of the communications may include sending one or more email messages, sending one or more text messages, and/or placing one or more phone calls, among other examples.

The management system may cause transmission of the communications for each of the plurality of users (e.g., to user devices associated with the plurality of users), except for the user (e.g., the one or more users) that resides in the location of the affected area. For example, the management system may cause transmission of the communications, except for a communication to the user, based on the incident satisfying the condition(s) described in connection with reference number 125. Due to the incident in the affected area, the user that resides in the location of the affected area is less likely to engage with the communication. Accordingly, by suppressing the communication for the user, that is not likely to be opened, read, or the like, computing resources and network resources used for transmitting communications are expended in a more inefficient manner.

In some implementations, the management system may determine a silence period that is to be used for a type of the incident. For example, the management system may determine the silence period based on a silence period indicated in the event data and/or the type of the incident indicated in the event data. As an example, if the incident is a first type of incident, then the management system may determine that a first silence period is to be used, and if the incident is a second type of incident, then the management system may determine that a second silence period is to be used. In some implementations, the management system may store a mapping of incident types to silence periods, and the management system may use the mapping to determine the silence period. In some implementations, the management system may determine the silence period using a machine learning model that is trained to output a silence period based on an input indicating a type of incident, a time and/or date when the incident began, and/or an adverse action history of the user.

The management system may cause transmission of the communications, except for a communication to the user, based on a determination that the silence period is ongoing. For example, if the incident began 4 days prior, and if the silence period for the incident is 7 days, then the management system may cause transmission of the communications except for a communication to the user. However, if the silence period for the incident were 3 days, then the management system may cause transmission of a communication to the user.

In some implementations, to cause transmission of the communications, the management system may generate the communications. For example, the management system may select a template for a communication and insert user-specific information into the template. In some implementations, to cause transmission of the communications, the management system may output a list of the plurality of users that are to receive communications, and/or output the generated communications, to a communication queue. A communication device (e.g., a message server) may then transmit the communications by pulling from the communication queue. In some implementations, to cause transmission of the communications, the management system may transmit the communications.

In addition, or alternatively, to transmission of the communications, the management system may perform one or more actions in connection with the user (e.g., the one or more users) that resides in the location of the affected area. For example, as shown by reference number 165, the management system may transmit, to an action control device, a request to delay the adverse action for the user. The management system may transmit the request via an API associated with the action control device. The action control device may be associated with an entity that carries out one or more tasks associated with the adverse action. For example, the entity may manage one or more agents that perform vehicle repossession.

Figure 1F:
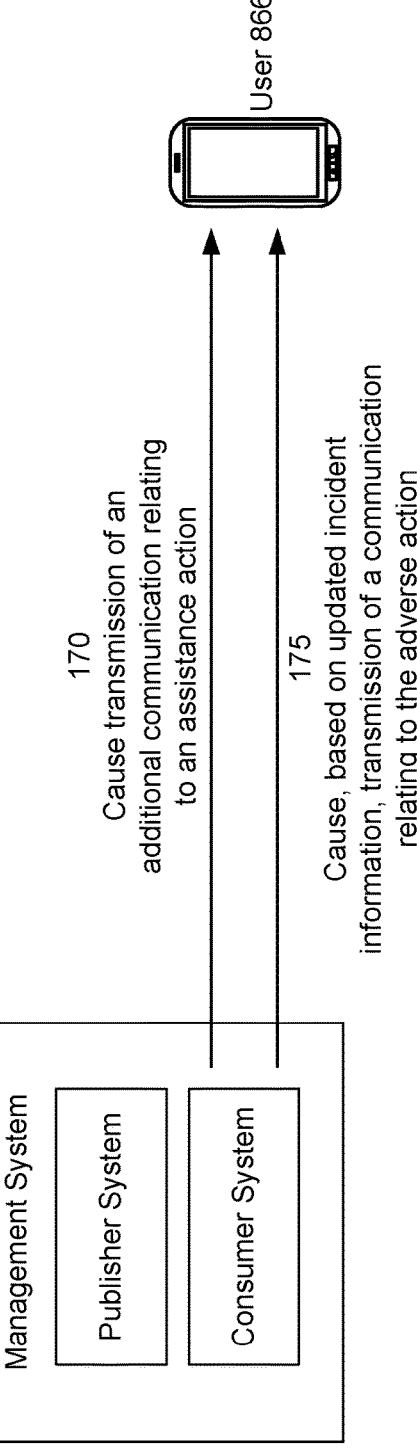

As shown in FIG. 1F, and by reference number 170, the management system (e.g., the consumer system of management system) may cause transmission of an additional communication to the user (e.g., the one or more users) that resides in the location of the affected area. The additional communication may relate to an assistance action for the user. For example, the additional communication may include an offer to perform the assistance action for the user, may include an indication that the assistance action was performed for the user, or the like. The assistance action may include providing a loan to the user, providing a cash advance for the user, adjusting the terms of an agreement with the user, or suspending one or more penalties for the user, among other examples.

The management system may periodically obtain incident information from the information service device, in a similar manner as described above. For example, the management system (e.g., the publisher system of the management system) may obtain, from the information service device, updated incident information. The updated incident information may indicate one or more locations of affected areas that were not indicated by the original incident information and/or one or more locations of affected areas indicated by the original incident information may not be indicated by the updated incident information. Accordingly, the updated incident information may indicate that the affected area is no longer affected by the incident. As shown by reference number 175, based on the updated incident information, the management system (e.g., the consumer system of the management system) may cause transmission of a communication relating to the adverse action for the user (e.g., the one or more users) that resides in the location of the affected area (e.g., because the affected area is no longer affected by the incident). Accordingly, the communication to the user that resides in the location is delayed until a time when the user is more likely to engage with the communication, thereby efficiently utilizing computing resources and network resources used for transmitting communications. In some implementations, the management system may wait for a waiting period (e.g., 3 days, 7 days, or the like), following the indication that the affected area is no longer affected by the incident, before transmitting the communication to the user.

As indicated above, FIGS. 1A-1F are provided as an example. Other examples may differ from what is described with regard to FIGS. 1A-1F.

Figure 2:
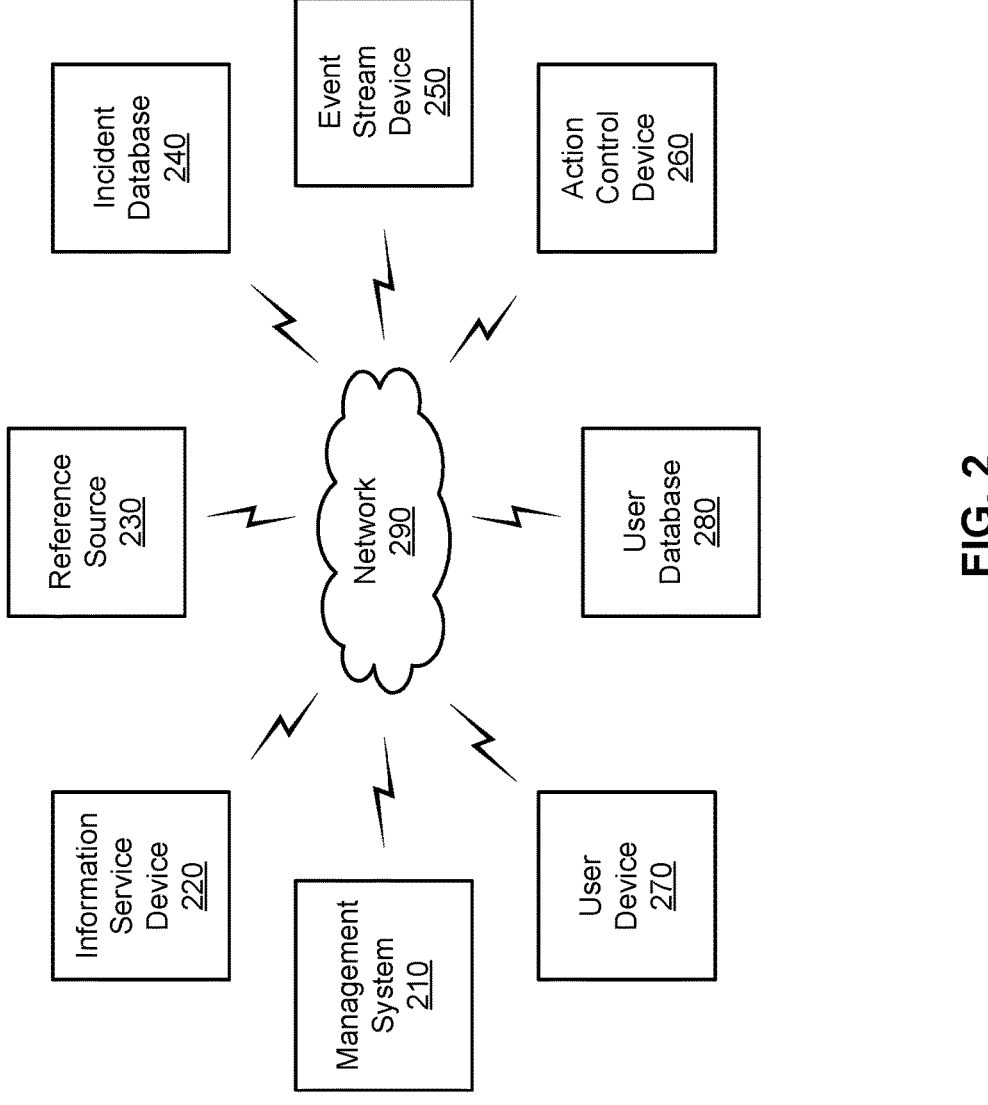
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a management system 210, an information service device 220, a reference source 230, an incident database 240, an event stream device 250, an action control device 260, a user device 270, a user database 280, and a network 290. Devices of environment 200 may interconnect via wired connections, wireless connections, or a combination of wired and wireless connections.

The management system 210 may include one or more devices capable of receiving, generating, storing, processing, providing, and/or routing information associated with selective communication transmission, as described elsewhere herein. The management system 210 may include a communication device and/or a computing device. For example, the management system 210 may include a server, such as an application server, a client server, a web server, a database server, a host server, a proxy server, a virtual server (e.g., executing on computing hardware), or a server in a cloud computing system. In some implementations, the management system 210 may include computing hardware used in a cloud computing environment.

The information service device 220 may include one or more devices capable of receiving, generating, storing, processing, providing, and/or routing information associated with locations of affected areas, as described elsewhere herein. The information service device 220 may include a communication device and/or a computing device. For example, the information service device 220 may include a server, such as an application server, a client server, a web server, a database server, a host server, a proxy server, a virtual server (e.g., executing on computing hardware), or a server in a cloud computing system. In some implementations, the information service device 220 may include computing hardware used in a cloud computing environment.

The reference source 230 may include one or more devices capable of receiving, generating, storing, processing, providing, and/or routing reference information (e.g., associated with one or more locations), as described elsewhere herein. The reference source 230 may include a communication device and/or a computing device. For example, the reference source 230 may include a server, such as an application server, a client server, a web server, a database server, a host server, a proxy server, a virtual server (e.g., executing on computing hardware), or a server in a cloud computing system. In some implementations, the reference source 230 may include computing hardware used in a cloud computing environment.

The incident database 240 may include one or more devices capable of receiving, generating, storing, processing, and/or providing information associated with incident information, as described elsewhere herein. The incident database 240 may include a communication device and/or a computing device. For example, the incident database 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the incident database 240 may store information relating to incidents (e.g., incidents that satisfied one or more conditions), as described elsewhere herein.

The event stream device 250 may include one or more devices capable of receiving, generating, storing, processing, providing, and/or routing information associated with event data associated with incidents, as described elsewhere herein. The event stream device 250 may include a communication device and/or a computing device. For example, the event stream device 250 may include a server, such as an application server, a client server, a web server, a database server, a host server, a proxy server, a virtual server (e.g., executing on computing hardware), or a server in a cloud computing system. In some implementations, the event stream device 250 may include computing hardware used in a cloud computing environment.

The action control device 260 may include one or more devices capable of receiving, generating, storing, processing, providing, and/or routing information associated with requests to delay adverse actions, as described elsewhere herein. The action control device 260 may include a communication device and/or a computing device. For example, the action control device 260 may include a server, such as an application server, a client server, a web server, a database server, a host server, a proxy server, a virtual server (e.g., executing on computing hardware), or a server in a cloud computing system. In some implementations, the action control device 260 may include computing hardware used in a cloud computing environment.

The user device 270 may include one or more devices capable of receiving, generating, storing, processing, and/or providing information associated with reception of communications, as described elsewhere herein. The user device 270 may include a communication device and/or a computing device. For example, the user device 270 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The user database 280 may include one or more devices capable of receiving, generating, storing, processing, and/or providing information associated with user information, as described elsewhere herein. The user database 280 may include a communication device and/or a computing device. For example, the user database 280 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user database 280 may store information relating to users associated with adverse actions, as described elsewhere herein.

The network 290 may include one or more wired and/or wireless networks. For example, the network 290 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 290 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
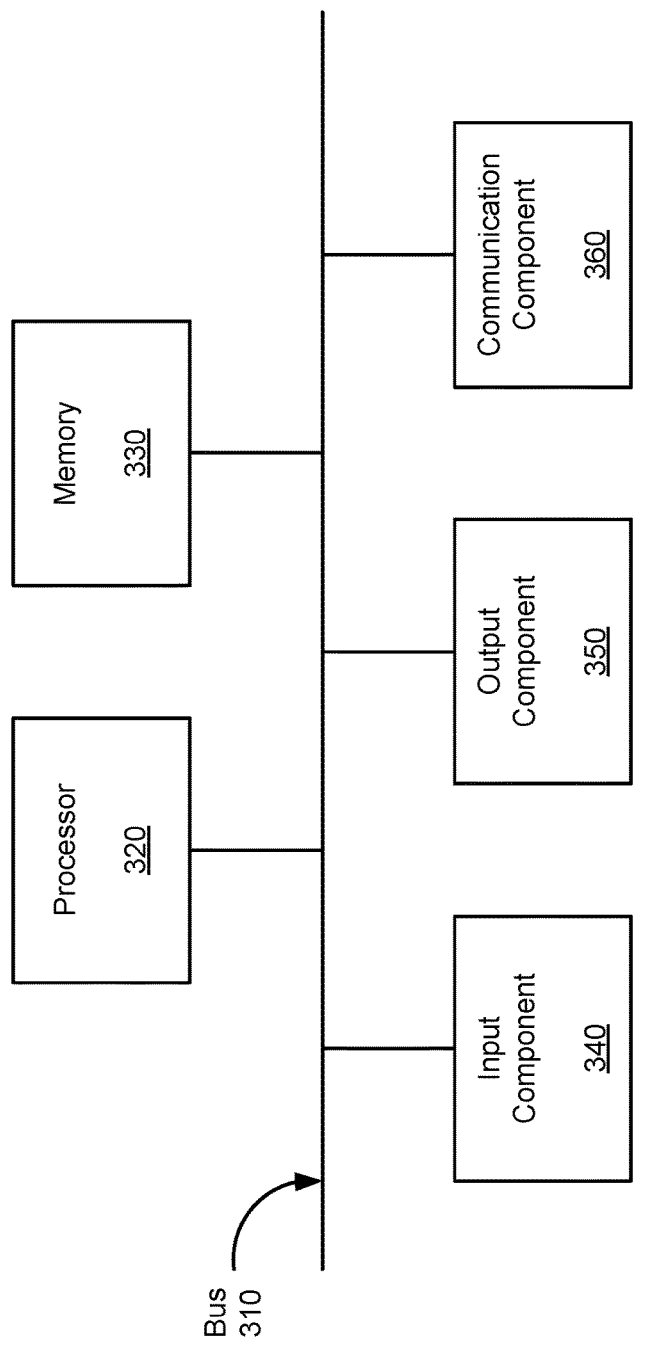
FIG. 3 is a diagram of example components of a device associated with selective communication transmission, in accordance with some embodiments of the present disclosure.

FIG. 3 is a diagram of example components of a device 300 associated with selective communication transmission. The device 300 may correspond to management system 210, information service device 220, reference source 230, incident database 240, event stream device 250, action control device 260, user device 270, and/or user database 280. In some implementations, management system 210, information service device 220, reference source 230, incident database 240, event stream device 250, action control device 260, user device 270, and/or user database 280 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with selective communication transmission. In some implementations, one or more process blocks of FIG. 4 may be performed by the management system 210. In some implementations, one or more process blocks of FIG. 4 may be performed by another device or a group of devices separate from or including the management system 210, such as information service device 220, reference source 230, incident database 240, event stream device 250, action control device 260, user device 270, and/or user database 280. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include retrieving, from a user database, information identifying a plurality of users that are to be subjected to an adverse action (block 410). For example, the management system 210 (e.g., using processor 320, memory 330, and/or communication component 360) may retrieve, from a user database, information identifying a plurality of users that are to be subjected to an adverse action, as described above in connection with reference number 140 of FIG. 1D. As an example, the adverse action may be planned to be taken against the plurality of users at a future time.

As further shown in FIG. 4, process 400 may include retrieving, from an event stream, event data relating to an incident that has affected an affected area, where the event data indicates at least a location of the affected area (block 420). For example, the management system 210 (e.g., using processor 320, memory 330, and/or communication component 360) may retrieve, from an event stream, event data relating to an incident that has affected an affected area, as described above in connection with reference number 150 of FIG. 1D. As an example, the management system may transmit a request (e.g., an API request) for events relating to incidents that have been published to the event stream, and receive, in response to the request, the event data relating to the incident.

As further shown in FIG. 4, process 400 may include identifying, based on the information identifying the plurality of users, one or more users of the plurality of users that reside in the location of the affected area (block 430). For example, the management system 210 (e.g., using processor 320 and/or memory 330) may identify, based on the information identifying the plurality of users, one or more users of the plurality of users that reside in the location of the affected area, as described above in connection with reference number 155 of FIG. 1D. As an example, the management system may identify the user based on addresses, zip codes, or the like, associated with the plurality of users, indicated by the information identifying the plurality of users.

As further shown in FIG. 4, process 400 may include causing transmission of communications relating to the adverse action for each of the plurality of users, except for the one or more users that reside in the location of the affected area (block 440). For example, the management system 210 (e.g., using processor 320, memory 330, and/or communication component 360) may cause transmission of communications relating to the adverse action for each of the plurality of users, except for the one or more users that reside in the location of the affected area, as described above in connection with reference number 160 of FIG. 1E. As an example, the communications may provide a reminder of an upcoming adverse action, may request a user to take a particular action to avoid the adverse action, may request a user to perform the adverse action, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for selective communication transmission, the system comprising:
   one or more memories; and
   one or more processors, communicatively coupled to the one or more memories, configured to:

obtain, from an information service device, incident information indicating a location of an affected area that has been affected by an incident;
   obtain, from a reference source, reference information indicating a current state associated with the location of the affected area;
   determine the incident that has affected the affected area by processing the reference information indicating the current state associated with the location of the affected area;
   retrieve, from a user database, information identifying a plurality of users that are to be subjected to an adverse action; and
   cause, based on the incident satisfying one or more conditions, transmission of communications relating to the adverse action for a subset of the plurality of users that do not include, one or more users, of the plurality of users, that reside in the location of the affected area,
   wherein the subset of the plurality of users are not associated with the location of the affected area.

2. The system of claim 1, wherein the one or more processors are further configured to:
   generate a record for the incident in a database based on a determination that the incident satisfies the one or more conditions,
   wherein the record indicates the location of the affected area and a type of the incident; and
   cause, based on the record being generated in the database, publication of event data associated with the incident to an event stream,
   wherein the event data indicates at least the location of the affected area.

3. The system of claim 1, wherein the one or more processors are further configured to:
   retrieve, from an event stream, event data associated with the incident,
   wherein the event data indicates at least the location of the affected area.

4. The system of claim 1, wherein the one or more processors, to determine the incident that affected the affected area by processing the reference information, are configured to:
   process the reference information using an artificial intelligence model; and
   determine the incident that affected the affected area based on an output of the artificial intelligence model.

5. The system of claim 1, wherein the one or more processors are further configured to:
   transmit, to an action control device, a request to delay the adverse action for the one or more users.

6. The system of claim 1, wherein the adverse action is one or more of a repossession action or a foreclosure action.

7. The system of claim 1, where the incident is a disaster incident that has been declared for the affected area by an entity.

8. The system of claim 1, wherein the one or more conditions include a first condition that an age of the incident satisfies an age threshold, and a second condition that a severity level of the incident satisfies a severity threshold.

9. The system of claim 1, wherein the one or more processors are further configured to:
   obtain, from the information service device, updated incident information indicating that the affected area is no longer affected by the incident; and cause, based on the updated incident information, transmission of one or more communications relating to the adverse action for the one or more users.

10. The system of claim 1, wherein the one or more conditions include at least one of:

an age of the incident, a severity level associated with the incident, a type of incident.

11. A method of selective communication transmission, comprising:

retrieving, by a device and from a user database, information identifying a plurality of users that are to be subjected to an adverse action;

retrieving, by the device and from an event stream, event data relating to an incident that has affected an affected area, wherein the event data indicates at least a location of the affected area;

identifying, by the device and based on the information identifying the plurality of users, one or more users of the plurality of users that reside in the location of the affected area; and causing, by the device, transmission of communications relating to the adverse action for a subset of the plurality of users that do not include, the one or more users that reside in the location of the affected area, wherein the subset of the plurality of users are not associated with the location of the affected area.

12. The method of claim 11, further comprising: determining a silence period to be used for a type of the incident, wherein causing transmission of the communications for each of the plurality of users, except for the one or more users, is based on a determination that the silence period is ongoing.

13. The method of claim 11, wherein the adverse action is one or more of a repossession action or a foreclosure action.

14. The method of claim 11, wherein the communications include at least one of:

one or more email messages, one or more text messages, or one or more automated phone calls.

15. The method of claim 11, further comprising: causing transmission of one or more additional communications relating to an assistance action for the one or more users.

16. The method of claim 11, wherein the event data indicates the location of the affected area, a type of the incident, and a silence period for the incident.

17. The method of claim 11, wherein retrieving the event data relating to the incident comprises:

transmitting, to an event stream device, a request for events relating to incidents that have been published to the event stream; and receiving, from the event stream device and in response to the request, the event data relating to the incident.

18. A non-transitory computer-readable medium storing a set of instructions, the set of instructions comprising:

one or more instructions that, when executed by one or more processors of a device, cause the device to:

retrieve, from a user database, information identifying a plurality of users that are to be subjected to an adverse action;

identify a location of an affected area that has been affected by an incident; and cause transmission of communications relating to the adverse action for a subset of the plurality of users that do not include, one or more users of the plurality of users that reside in the location of the affected area, wherein the subset of plurality of users are not associated with the location of the affected area.

19. The non-transitory computer-readable medium of claim 18, wherein the one or more instructions, that cause the device to identify the location of the affected area, cause the device to:

retrieve, from an event stream, event data relating to the incident that has affected the affected area, wherein the event data indicates at least the location of the affected area.

20. The non-transitory computer-readable medium of claim 18, wherein the one or more instructions, that cause the device to identify the location of the affected area, cause the device to:

process reference information using an artificial intelligence model; and determine the location of the affected area based on an output of the artificial intelligence model.

\* \* \* \* \*